(12) United States Patent
Xue et al.

(10) Patent No.: US 9,829,352 B2
(45) Date of Patent: Nov. 28, 2017

(54) DISTRIBUTION MEASUREMENT SYSTEM FOR PRESSURE, TEMPERATURE, STRAIN OF MATERIAL, MONITORING METHOD FOR CARBON DIOXIDE GEOLOGICAL SEQUESTRATION, ASSESSING METHOD FOR IMPACT OF CARBON DIOXIDE INJECTION ON INTEGRITY OF STRATA, AND MONITORING METHOD FOR FREEZING USING SAME

(71) Applicants: RESEARCH INSTITUTE OF INNOVATIVE TECHNOLOGY FOR THE EARTH, Kizugawa-shi (JP); NEUBREX CO., LTD., Kobe-shi (JP)

(72) Inventors: Ziqiu Xue, Kizugawa (JP); Yoshiaki Yamauchi, Kobe (JP); Kinzo Kishida, Kobe (JP)

(73) Assignees: RESEARCH INSTITUTE OF INNOVATIVE TECHNOLOGY FOR THE EARTH, Kizugawa-Shi, Kyoto (JP); NEUBREX CO., LTD., Kobe-Shi, Hyogo (JP)

( * ) Notice: Subject to any disclaimer, the term of this patent is extended or adjusted under 35 U.S.C. 154(b) by 104 days.

(21) Appl. No.: 14/417,962

(22) PCT Filed: Aug. 7, 2013

(86) PCT No.: PCT/JP2013/071371
§ 371 (c)(1),
(2) Date: Jan. 28, 2015

(87) PCT Pub. No.: WO2014/027592
PCT Pub. Date: Feb. 20, 2014

(65) Prior Publication Data
US 2015/0211900 A1 Jul. 30, 2015

(30) Foreign Application Priority Data

Aug. 17, 2012 (JP) .................................. 2012-180725

(51) Int. Cl.
*G01N 21/00* (2006.01)
*G01D 5/353* (2006.01)
(Continued)

(52) U.S. Cl.
CPC .............. *G01D 5/353* (2013.01); *B01J 19/00* (2013.01); *G01B 11/16* (2013.01); *G01B 11/18* (2013.01);
(Continued)

(58) Field of Classification Search
None
See application file for complete search history.

(56) References Cited

U.S. PATENT DOCUMENTS

| 4,427,263 A | * | 1/1984 | Lagakos | ................ G02B 6/443 385/128 |
| 6,380,534 B1 | * | 4/2002 | Farhadiroushan | . G01D 5/35364 250/227.14 |

(Continued)

FOREIGN PATENT DOCUMENTS

| JP | 2006-145465 A | 6/2006 |
| JP | 2009-42005 A | 2/2009 |

(Continued)

OTHER PUBLICATIONS

Benson, S., and Larry Myer. "Monitoring to ensure safe and effective geologic sequestration of carbon dioxide." See Ref 105 (2002): 137-51.*

(Continued)

*Primary Examiner* — Kara E Geisel
*Assistant Examiner* — Rufus Phillips
(74) *Attorney, Agent, or Firm* — Buchanan Ingersoll & Rooney PC

(57) ABSTRACT

Distributions of a Brillouin frequency shift and a Rayleigh frequency shift in optical fibers set up in a material are measured from scattered waves of pulse laser light entered into the optical fibers, and distributions of pressure, temperature, and strain of the material along the optical fibers at a measurement time point are analyzed using coefficients that are inherent to the set up optical fibers and correlate pressure, temperature, and strain of material with the Brillouin frequency shift and the Rayleigh frequency shift.

10 Claims, 17 Drawing Sheets

(51) Int. Cl.
| | | |
|---|---|---|
| B01J 19/00 | (2006.01) | |
| G01K 11/12 | (2006.01) | |
| G01B 11/16 | (2006.01) | |
| G01K 11/32 | (2006.01) | |
| G01L 1/24 | (2006.01) | |
| G01L 19/00 | (2006.01) | |

(52) U.S. Cl.
CPC ......... *G01D 5/35361* (2013.01); *G01K 11/12* (2013.01); *G01K 11/32* (2013.01); *G01L 1/242* (2013.01); *G01L 19/00* (2013.01); *G01K 2011/322* (2013.01)

(56) References Cited

U.S. PATENT DOCUMENTS

| | | | | |
|---|---|---|---|---|
| 6,496,265 | B1* | 12/2002 | Duncan | G01D 5/268 |
| | | | | 356/35.5 |
| 6,788,417 | B1* | 9/2004 | Zumberge | G01H 9/004 |
| | | | | 356/477 |
| 8,699,009 | B2* | 4/2014 | Li | G01B 11/18 |
| | | | | 356/33 |
| 2008/0068586 | A1 | 3/2008 | Kishida et al. | |
| 2010/0002226 | A1* | 1/2010 | Hartog | G01D 5/35364 |
| | | | | 356/73.1 |
| 2010/0014071 | A1* | 1/2010 | Hartog | G01D 5/35361 |
| | | | | 356/73.1 |

FOREIGN PATENT DOCUMENTS

| | | |
|---|---|---|
| JP | 2010-216877 A | 9/2010 |
| JP | 2011-053146 A | 3/2011 |
| WO | WO 2006/001071 A1 | 1/2006 |

OTHER PUBLICATIONS

Holloway, S. "Underground sequestration of carbon dioxide—a viable greenhouse gas mitigation option." Energy 30.11 (2005): 2318-2333.*
Inaudi, D., R. Belli, and D. Posenato. "Distributed sensing for damage localization." 6th International Conference on Bridge Maintenance, Safety, and Management (IABMAS 2012). 2012.*
International Search Report (PCT/ISA/210) dated Oct. 29, 2013, by the Japanese Patent Office as the International Searching Authority for International Application No. PCT/JP2013/071371.

* cited by examiner

DISTRIBUTION MEASUREMENT SYSTEM FOR PRESSURE, TEMPERATURE, STRAIN OF MATERIAL, MONITORING METHOD FOR CARBON DIOXIDE GEOLOGICAL SEQUESTRATION, ASSESSING METHOD FOR IMPACT OF CARBON DIOXIDE INJECTION ON INTEGRITY OF STRATA, AND MONITORING METHOD FOR FREEZING USING SAME

TECHNICAL FIELD

The present invention relates to a system for measuring simultaneously distributions of pressure, temperature, and strain of material by mean of Brillouin frequency shift and Rayleigh frequency shift phenomena in an optical fiber, and further relates to a method of monitoring and measuring characteristics of extensive material such as geological strata using the system.

BACKGROUND ART

There are known various measuring techniques that use the Brillouin scattering phenomenon in an optical fiber (for example, Patent Document 1). One of the techniques is a distributed pressure sensor that utilizes a Brillouin frequency shift caused by strain applied to an optical fiber. Because the Brillouin frequency shift depends on strain applied to the optical fiber, pressure applied can be measured by analyzing the frequency shift of the optical fiber that is fixed to a material deformable by pressure.

The present inventors have already proposed a system for measuring mainly pressure and temperature distributions by mean of the Rayleigh frequency shift phenomenon as well as the Brillouin frequency shift phenomenon of an optical fiber (refer to Patent Document 2). Since this system aims to measure distributions of pressure and temperature and the optical fiber is not fixed to an object to be measured, strain measured by this system is of no use.

The pressure measurement technique using an optical fiber is applicable to volume change measurement of an object. For example, porous sandstone, because it changes in volume before and after containing liquid, is one application target of the above pressure measurement technique. Technologies for geologically sequestrating carbon dioxide are being developed recently as global warming countermeasures. In cases of implementing carbon dioxide geological sequestration, the foregoing pressure measurement technique can contribute to construction of systems for monitoring a sequestrated state of carbon dioxide in a sandstone and for monitoring geomechanical integrity and safety of a cap rock stratum (such as an argillaceous rock) that is the upper stratum on the sandstone.

PRIOR ART DOCUMENT

Patent Document

Patent Document 1: WO2006/001071 A1
Patent Document 2: JP 2010-216877 A

SUMMARY OF THE INVENTION

Problem that the Invention is to Solve

However, a method of accurately detecting, for example, a state change of underground strata has not been proposed yet. Using electrical pressure sensors allows for detecting pressure changes at some spots. However, it remains unrevealed what relationship exists between the pressure changes and a deformation observed on the ground surface and whether the geomechanical integrity is retainable if the deformation occurs on the ground surface.

The present invention is made in light of the above-described problem, with an object of providing a system that is capable of measuring simultaneously distributions of pressure, temperature, and strain of material and thereby monitors and evaluates accurately the state of an extensive material such as under the ground.

Means for Solving the Problem

A measurement system according to the present invention includes a scattered wave acquisition unit for acquiring optical fiber scattered waves of pulse laser light entered into optical fibers set up in or along a material; a Brillouin frequency-shift measurement unit for measuring distribution of a Brillouin frequency shift in the optical fiber from the scattered waves; a Rayleigh frequency-shift measurement unit for measuring distribution of a Rayleigh frequency shift in the optical fiber from the scattered waves; a coefficient storage unit for storing coefficients that are inherent to the optical fibers set up and correlate pressure, temperature, and strain of material with the Brillouin frequency shift and the Rayleigh frequency shift; and an analyzer unit for analyzing distributions of pressure, temperature, and strain of the material along the optical fibers at a measurement time point, using the Brillouin frequency-shift distribution measured by the Brillouin frequency-shift measurement unit, the Rayleigh frequency-shift distribution measured by the Rayleigh frequency-shift measurement unit, and the coefficients stored in the coefficient storage unit.

Advantages of the Invention

According to the present invention, a system can be provided that is capable of measuring accurately and simultaneously distributions of pressure, temperature, and strain of material and thereby monitors and evaluates accurately the state of an extensive material such as under the ground.

EMBODIMENTS FOR CARRYING OUT THE INVENTION

Embodiment 1

Figure 1:
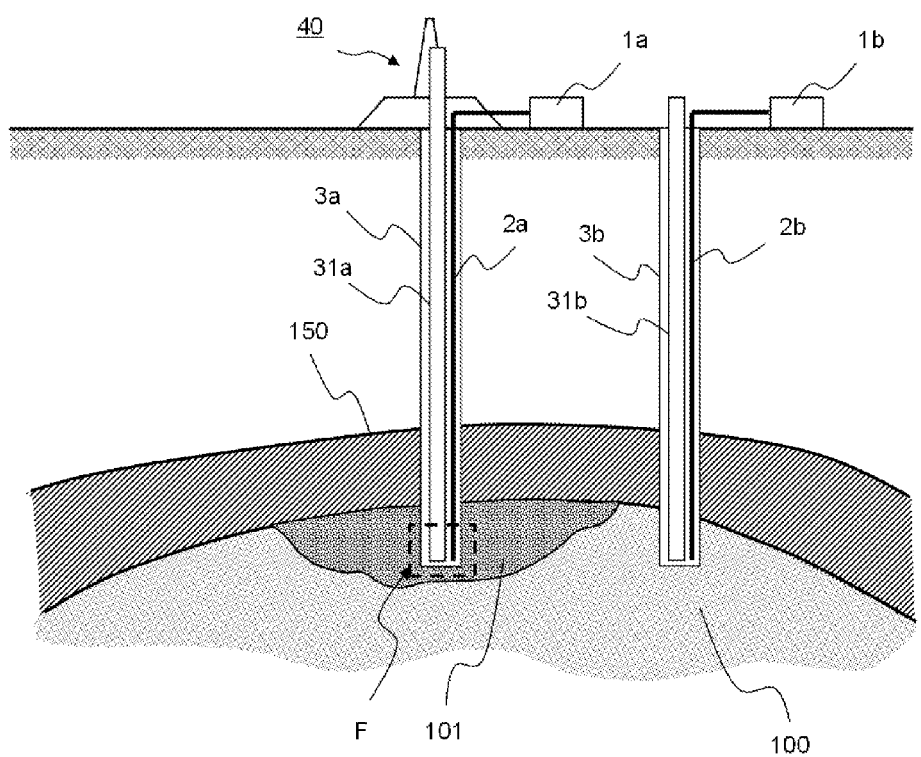
FIG. 1 is a cross sectional view schematically illustrating a monitoring system for a carbon dioxide geological sequestration by mean of a system of Embodiment 1 of the present invention for measuring distributions of pressure, temperature, and strain of material.
Figure 2:
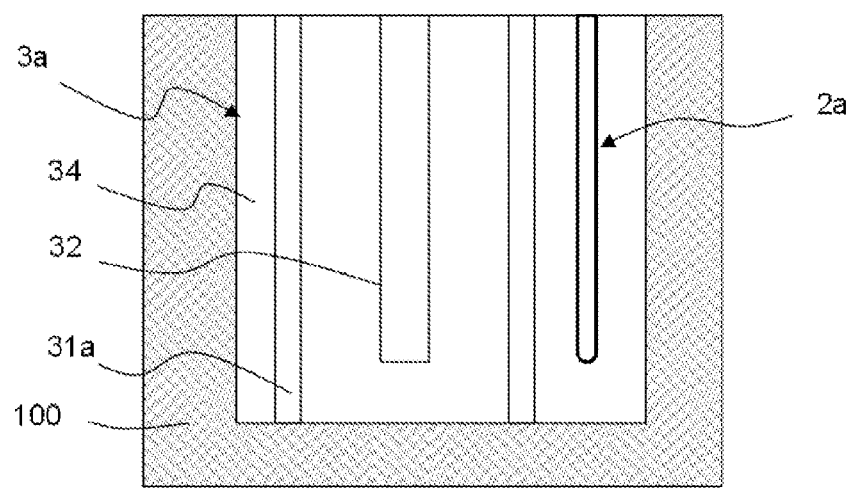
FIG. 2 is an enlarged view of the portion F in FIG. 1 illustrating the monitoring system for the carbon dioxide geological sequestration by mean of the system of Embodiment 1 of the present invention for measuring distributions of pressure, temperature, and strain of material.
Figure 3:
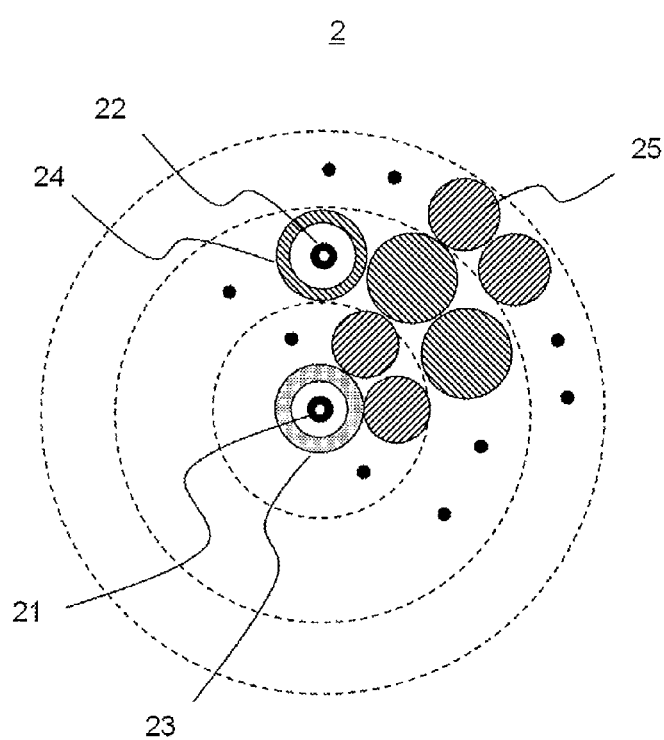
FIG. 3 is an enlarged cross sectional view of a sensor cable used in the system of Embodiment 1 of the present invention for measuring distributions of pressure, temperature, and strain of material.

FIG. 1 is a schematic cross sectional view illustrating a system for monitoring carbon dioxide geological sequestration by mean of a system of Embodiment 1 of the present invention for measuring distributions of pressure, temperature, and strain of material; FIG. 2 is an enlarged view of the portion F in FIG. 1; and FIG. 3 is an enlarged cross sectional view of a sensor cable in FIG. 1. It is assumed that there exist under the ground a sandstone stratum 100 that is a carbon dioxide trapping stratum and a cap rock stratum 150 thereabove that serves as a seal stratum. A injection well 3a is drilled toward the underground sandstone stratum 100 from a storage site 40 set up on the ground. A cylindrical casing 31a having a carbon dioxide injection tube 32 inserted thereinside is installed in the injection well 3a. The casing 31a is fixed to underground strata by performing cementing 34 therearound. Near around the injection well 3a, an observation well 3b is often drilled to observe the underground state. Ordinarily, a cylindrical casing 31b similar to that inserted in the injection well 3a is installed in the observation well 3b. The casing 31b is filled with water, and various sensors are inserted therein side.

A sensor cable 2a is buried along in the column of the cementing 34 to measure distributions of pressure P, temperature T, and strain ϵ of the underground strata along the injection well 3a. Moreover, a sensor cable 2b may be buried along in the column of the cementing along the observation well 3b. Hereinafter, the sensor cable 2a and the sensor cable 2b are collectively referred to as a sensor cable 2. FIG. 3 shows an example of a cross-sectional structure of the sensor cable 2. The sensor cable 2 includes a first optical fiber 21 that is affected by pressure and a second optical fiber 22 that is free from influence of the pressure. The second optical fiber 22 is accommodated in a fine metal tube 24 for insulation from the pressure. The first optical fiber 21 may be provided with a protection cover 23 therearound. It should be noted that the protection cover 23 needs to be made of such a material and to have such a structure that the first optical fiber 21 is affected by the ambient pressure and deformation. The first optical fiber 21 and the fine metal tube 24 are, for example, twisted along with a plurality of metal wires 25 to constitute the sensor cable 2. The first optical fiber 21 needs to be fixed to the column of the cementing 34 to measure the strain ϵ of the strata. The fixation may be performed longitudinally throughout or at intervals of a few meters along the first optical fiber 21.

When a volume change occurs in the surrounding strata, the volume change affects the sensor cable 2 because it is buried in the column of the cementing 34. For example, when the strata are deformed by the carbon dioxide injection, the sensor cable 2 is subjected to the deformation together with the column of the cementing 34. In that case, the first optical fiber 21 receives and detects pressure of the deformed strata while the second optical fiber 22 accommodated in the fine metal tube 24 is unaffected.

For each of the first optical fiber 21 and the second optical fiber 22 thus configured, Brillouin measurement and Rayleigh measurement are performed by a measurement system 1 installed on the ground surface, to obtain distributions of Brillouin frequency shift and Rayleigh frequency shift along the optical fibers. From these distributions of Brillouin frequency shift and Rayleigh frequency shift, distributions of pressure, temperature, and stain along the sensor cable 2 can be determined simultaneously. For that reason, the inventors named the measurement system 1 as "distributed pressure temperature strain system (DPTSS) 1".

Here, the principle of measuring distributions of pressure, temperature, and strain by mean of an optical fiber will be described. When light is entered into an optical fiber and a frequency analysis is performed for the scattered light, there are observed Rayleigh scattered light having substantially the same frequency as the entered light, Raman scattered light having a frequency largely different from the entered light, and Brillouin scattered light having a frequency different from the entered light by a few to about several tens GHz.

The Brillouin scattering phenomenon is a phenomenon caused by power transfer via acoustic phonon in an optical fiber when light is entered thereinto. The frequency difference between the entered light and the Brillouin scattered light is referred to as Brillouin frequency. The Brillouin frequency is proportional to sound velocity in the optical fiber and the sound velocity depends on strain and temperature of the optical fiber. Hence, measurement of Brillouin frequency change allows for measurement of strain applied to and/or temperature of the optical fiber. Moreover, the present inventors have confirmed that the Brillouin frequency also changes with pressure applied to the optical fiber. Here, the Brillouin frequency change is referred to as Brillouin frequency shift.

The Rayleigh scattering phenomenon is a phenomenon caused by light scattering due to variation of the refractive index of an optical fiber. The frequency difference between the entered light and the Rayleigh scattered light is Rayleigh frequency. The Rayleigh frequency also changes with strain applied to and/or temperature of the optical fiber. Here, the Rayleigh frequency change is referred to as Rayleigh frequency shift.

Conventionally, the Rayleigh scattering phenomenon has been considered as having sensitivity to strain and temperature only. In Patent Document 2 disclosed earlier by the present inventors, a system is proposed on the basis that the Rayleigh scattering phenomenon has sensitivity to strain and temperature only. As a result of a subsequent study of the present inventors, it turned out that the Rayleigh scattering phenomenon also has sensitivity to pressure in addition to strain and temperature, as with the Brillouin scattering phenomenon. That is, the Brillouin frequency shift $\Delta v_B$ and the Rayleigh frequency shift $\Delta v_R$ can be expressed as equations (1) and (2), respectively, with a pressure change amount $\Delta P$, a temperature change amount $\Delta T$, and a strain change amount $\Delta \epsilon$.

$$\Delta v_B = C_{13} \Delta P + C_{12} \Delta T + C_{11} \Delta \epsilon \quad (1)$$

$$\Delta v_R = C_{23} \Delta P + C_{22} \Delta T + C_{21} \Delta \epsilon \quad (2)$$

where $C_{ij}$ are coefficients inherent to an optical fiber. By determining values of these coefficients such as through a preliminary test for an optical fiber to be used, distributions of the pressure change amount $\Delta P$, the temperature change amount $\Delta T$, the strain change amount $\Delta \epsilon$ can be calculated as described below. Thus, introduction of the pressure term into the Rayleigh scattering shift $\Delta v_R$ allows for measuring distributions of pressure, temperature, and strain with higher accuracy.

Now, it is assumed that a Brillouin frequency shift $\Delta v_B$ and a Rayleigh frequency shift $\Delta v_R$ are measured. In order to separate influences of pressure P, temperature T, and strain $\epsilon$ in the measurement values, three or more independent measurement quantities are required. Because only two independent measurement values: a Brillouin frequency shift $\Delta v_B$ and a Brillouin frequency shift $\Delta v_R$ are obtained from one optical fiber, four independent measurement values can be obtained by using two kinds of optical fibers each having a different sensitivity to pressure P, temperature T, and strain $\epsilon$. That is, the following simultaneous equations (3) are obtained.

$$\Delta v_B^1 = C_{13}^1 \Delta P + C_{12}^1 \Delta T + C_{11}^1 \Delta \epsilon^1$$

$$\Delta v_R^1 = C_{23}^1 \Delta P + C_{22}^1 \Delta T + C_{21}^1 \Delta \epsilon^1$$

$$\Delta v_B^2 = C_{13}^2 \Delta P + C_{12}^2 \Delta T + C_{11}^2 \Delta \epsilon^2$$

$$\Delta v_R^2 = C_{23}^2 \Delta P + C_{22}^2 \Delta T + C_{21}^2 \Delta \epsilon^2, \quad (3)$$

where the superscript numerals designate the kinds of optical fibers. Since the pressure and the temperature are those of a field where the optical fibers are located, the two kinds of optical fibers have the same values. On the other hand, the strain value depends on whether or not the optical fiber is fixed to the surrounding material. Since DPTSS needs to measure strain of material around the fiber, at least one fiber must be fixed to the surrounding material.

By solving the above simultaneous equations (3), the influences of pressure P, temperature T, and strain $\epsilon$ can be separated. Accordingly, by performing a hybrid measurement of Brillouin frequency shift measurement (referred to as Brillouin measurement) and Rayleigh frequency shift measurement (referred to as Rayleigh measurement) and by solving the simultaneous equations (3), there can be determined the distributions of the pressure change amount $\Delta P$, the temperature change amount $\Delta T$, and the strain change amount $\Delta \epsilon$ along the optical fibers.

Designating the first optical fiber 21 and the second optical fiber 22 in FIGS. 1 to 3 by the superscript numerals "1" and "2" in the equations (3), respectively, the equations (3) are simplified to equations (4) as below:

$$\Delta v_B^1 = C_{13}^1 \Delta P + C_{12}^1 \Delta T + C_{11}^1 \Delta \epsilon^1$$

$$\Delta v_R^1 = C_{23}^1 \Delta P + C_{22}^1 \Delta T + C_{21}^1 \Delta \epsilon^1$$

$$\Delta v_B^2 = C_{12}^2 \Delta T + C_{11}^2 \Delta \epsilon^2$$

$$\Delta v_R^2 = C_{22}^2 \Delta T + C_{21}^2 \Delta \epsilon^2, \quad (4)$$

because the second optical fiber 22 is free from influence of pressure.

Also in the equations (4), since the pressure and the temperature are those of the field where the optical fibers are located, the two kinds of optical fibers have the same values. As for the strain, on the other hand, strain $\epsilon^1$ experienced by the first optical fiber fixed to the surrounding material is different from strain $\epsilon^2$ experienced by the second optical fiber accommodated in the fine metal tube. Although there are four unknown quantities: $\Delta P$, $\Delta T$, $\Delta \epsilon^1$, $\Delta \epsilon^2$, there are also the four equations. Hence, these four unknown quantities can be determined. Note that a value useful as strain is the strain $\epsilon^1$ of the first optical fiber directly experiencing the strain of the surrounding material.

Each coefficient $C_{ij}$ in equations (4) are beforehand determined for the first and second optical fibers such as through a preliminary test. Then, the hybrid measurement of Brillouin measurement and Rayleigh measurement are performed and the simultaneous equations (4) are solved. In this way, the distributions of the pressure change amount $\Delta P$, the temperature change amount $\Delta T$, and the strain change amount $\Delta \epsilon$ along the optical fibers can be determined. Since the hybrid measurement of Brillouin measurement and Rayleigh measurement can be performed simultaneously at any given time point, not only one dimensional distributions of the pressure change amount $\epsilon P$, the temperature change amount $\Delta T$, and the strain change amount $\Delta \epsilon$ along the optical fibers but also their time-series data can be obtained.

It is needed to take a notice that the equations (4) are for increment quantities. That is, determination of a Brillouin frequency shift and a Rayleigh frequency shift in the left hand side of the equations requires two measurements: a reference measurement in an initial state and an actual measurement after a change of the state. Note that respective quantities determined by solving the equations (4) are the amounts of pressure, temperature, and strain changes from the reference initial state. In a case of requiring absolute quantities of pressure, temperature, and strain, each absolute quantity distribution of pressure, temperature, and strain is measured beforehand in the initial measurement in some way.

The initial state may be chosen arbitrarily. As for monitoring the carbon dioxide geological sequestration, the initial measurement may be performed in a constant temperature room on the ground before the cables are set up in the boreholes (the injection well 3a and the observation well 3b). In that case, a state of uniform and constant distributions of pressure and temperature may be employed as the initial state.

Otherwise, a state after set up of the cables in the boreholes and before injection of carbon dioxide may also be employed as the initial state. In this case, the change amounts of pressure, temperature, and strain caused by injection of carbon dioxide can be directly obtained by solving the equations (4). In a case of requiring absolute quantities of pressure, temperature, and strain, absolute quantity distributions of pressure, temperature that are measured such as by electrical sensors at a quiescent state of the borehole before carbon dioxide injection may be used. The initial data measured in the constant temperature room on the ground allows for obtaining also absolute quantity distributions of pressure and temperature from a measurement performed before carbon dioxide injection.

Thus, acquiring absolute-quantity-distribution change data of or change amount distribution data of pressure P, temperature T, and strain $\epsilon$ allows for monitoring changes and distributions of pressure, temperature, and strain associated with carbon dioxide injection into the sandstone stratum 100. Thereby, for example, the state of injected carbon dioxide and leakage thereof from the cap rock stratum 150 can be monitored.

Figure 4:
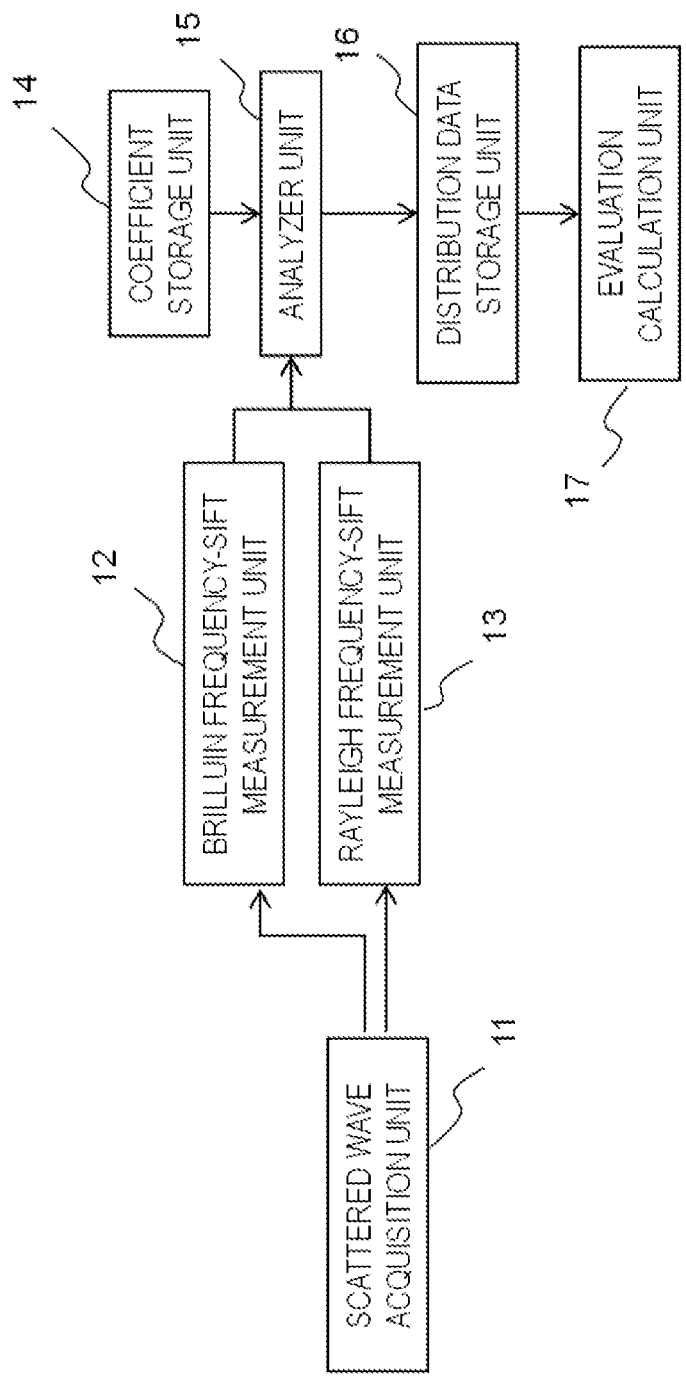
FIG. 4 is a block diagram showing an example configuration of "DPTSS", the system of Embodiment 1 of the present invention for measuring distributions of pressure, temperature, and strain of material.

FIG. 4 is a schematic block diagram showing an example of the DPTSS 1. A scattered wave acquisition unit 11 acquires scattered waves in optical fibers. The scattered waves acquired are analyzed in a Brillouin frequency-shift measurement unit 12 to measure a Brillouin frequency shift. At this time, the Brillouin frequency shift is measured as a distribution along the length of the optical fiber. Likewise, a Rayleigh frequency-shift measurement unit 13 measures a Rayleigh frequency shift. The Rayleigh frequency shift is measured also as a distribution along the length of the optical fiber.

A coefficient storage unit 14 stores beforehand the coefficients $C_{ij}$ in the equations (4) determined in the preliminary test or the like. Using the measured Brillouin frequency shift and Rayleigh frequency shift and the coefficients stored in the coefficient storage unit 14, a pressure change amount $\Delta P$, a temperature change amount $\Delta T$, and a strain change amount $\Delta \epsilon$ are analyzed in an analyzer unit 15 through the use of the equations (4), and stored in a distribution data storage unit 16. The above measurement and analysis are executed at predetermined time intervals, and their results are stored in the distribution data storage unit 16 as time interval change-amount distribution data of pressure, temperature, and strain. In a case where initial absolute quantity distributions of pressure, temperature, and strain are measured in the initial measurement, storage of these data in the distribution data storage unit 16 allows for obtaining absolute quantity distribution data at each time point in addition to the change amount distribution data. An evaluation calculation unit 17 evaluates the state of the sandstone stratum 100 such as from the time interval change amounts of pressure, temperature, and stain. Thereby, for example, the state of carbon dioxide storage and the like are monitored.

Figure 5:
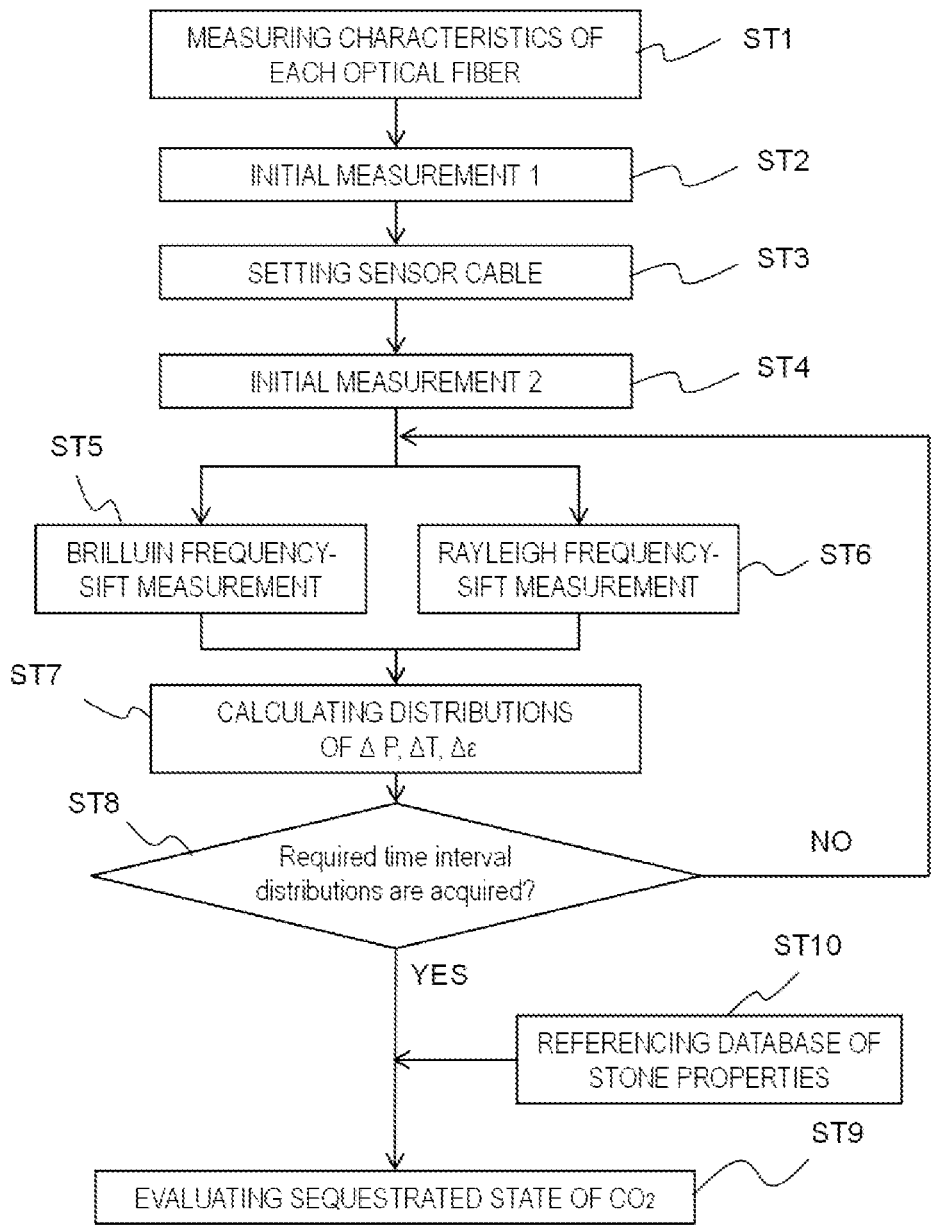
FIG. 5 is a flow diagram showing an example process of evaluating a sequestrated state of carbon dioxide using the system of Embodiment 1 of the present invention for measuring distributions of pressure, temperature, and strain of material.

An example process of evaluating a sequestrated state of carbon dioxide by the system of FIG. 1 is shown in the flow diagram of FIG. 5. First, two kinds of optical fibers to be set up as the first optical fiber 21 and the second optical fiber 22 are prepared, and the individual coefficients $C_{ij}$ in the equations (4) is determined beforehand by measuring characteristics of each optical fiber in the laboratory test or the like (ST1). The determined individual coefficients $C_{ij}$ are stored in, for example, the coefficient storage unit 14 of the DPTSS 1. For the two kinds of optical fibers whose individual coefficients have been determined, which are the first optical fiber 21 and the second optical fiber 22 of the sensor cable 2, an initial measurement 1 is performed first under a uniform and constant condition of pressure and temperature in a constant temperature room to measure a reference Brillouin spectrum and a reference Rayleigh spectrum that are references for the Brillouin frequency shift and the Rayleigh frequency shift (ST2). Next, with the configuration as shown in FIGS. 1 to 3, the sensor cable 2 is set up in the injection well 3a or the observation well 3b to reach the underground sandstone stratum 100, the carbon dioxide trapping stratum (ST3).

After completion of the setting up of the sensor cable 2, an initial measurement 2 is performed for a reference Brillouin spectrum and a reference Rayleigh spectrum, which are another references of the Brillouin frequency shift and the Rayleigh frequency shift (ST4). In a case of requiring absolute quantities of pressure and temperature, a Brillouin frequency shift and a Rayleigh frequency shift are determined from the measurement data of the initial measurement 1 and the initial measurement 2, to calculate distributions of a pressure change amount $\Delta P$ and a temperature change amount $\Delta T$ using the simultaneous equations (4). Subsequently, absolute quantity distributions of pressure and temperature in the initial measurement 2 are calculated using the pressure and the temperature of the constant temperature room in the initial measurement 1.

When carbon dioxide injection is started, a Brillouin spectrum and a Rayleigh spectrum are measured. Then, Brillouin frequency shifts $\Delta v^1_B$, $\Delta v^2_B$ are determined (ST5) and Rayleigh frequency shifts $\Delta v^1_R$, $\Delta v^2_R$ are determined (ST6) by taking the difference between the measured spectrum data and the measurement data of the initial measurement 2. Distributions of a pressure change amount $\Delta P$, a temperature change amount $\Delta T$, and a strain change amount $\Delta \epsilon$ are calculated using the simultaneous equations (4) (ST7). The steps ST5, ST6, ST7 are executed in the DPTSS 1 at predetermined time intervals as described above ("NO" in ST8), and the measurement results are stored as time interval data in the distribution data storage unit 16. The pressure change amount $\Delta P$, the temperature change amount $\Delta T$, and the strain change amount $\Delta \epsilon$ calculated here are respective amounts changed from the above-described initial measurement 2. If required time interval distributions are acquired ("YES" in ST8), the sequestrated state of carbon dioxide can be evaluated (ST9), as described later, by referencing a database of the stone properties such as porosity and permeation velocity of carbon dioxide (ST10).

Figure 6:
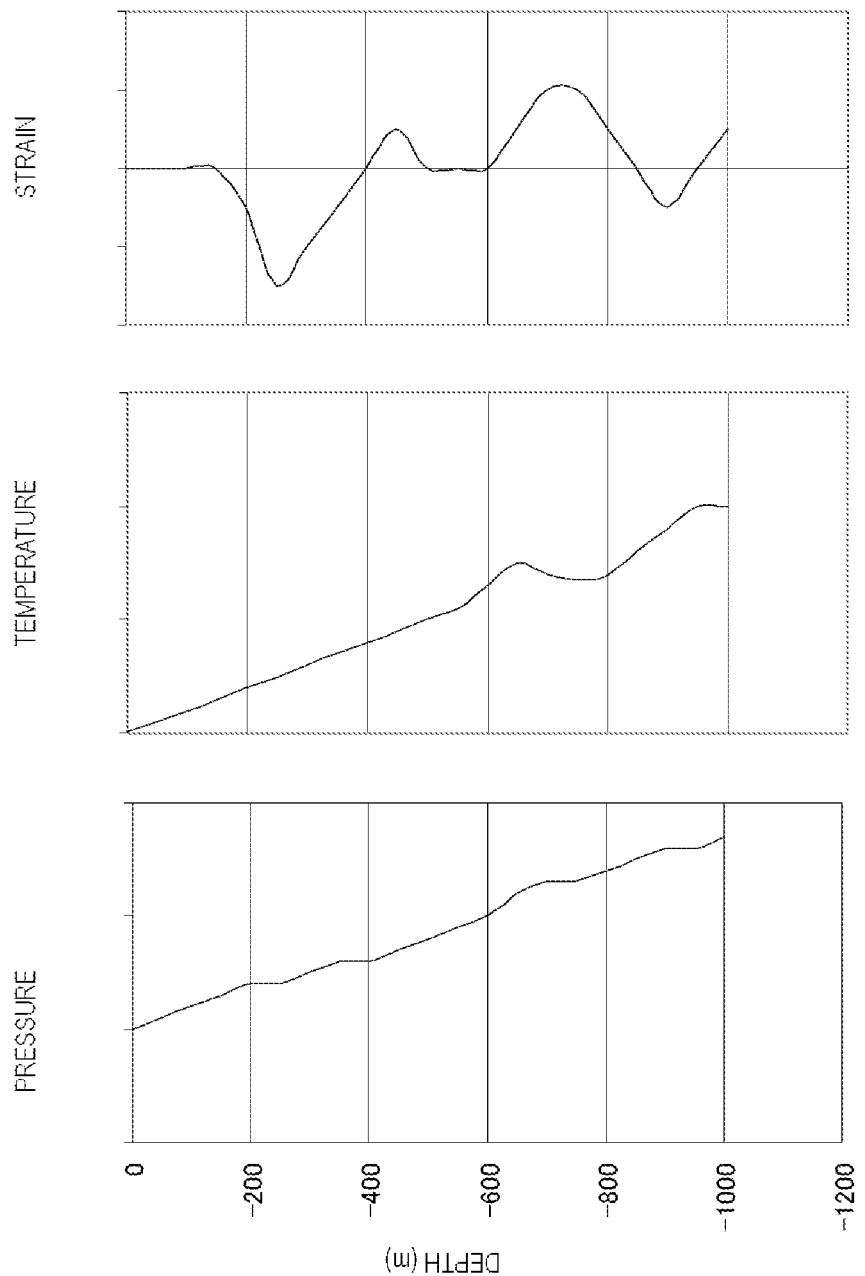
FIG. 6 is graphs conceptually illustrating measurement results obtained by using the system of Embodiment 1 of the present invention for measuring distributions of pressure, temperature, and strain of material.

A conceptual example of measurement data at some time point is illustrated in FIG. 6. FIG. 6 shows a case of the optical fibers set up to reach a depth of 1,000 m. As shown in FIG. 6, depthwise distribution data of change amounts of or absolute quantities of pressure P, temperature T, and stain ϵ at some time point can be obtained by the hybrid measurement of Brillouin measurement and Rayleigh measurement.

Figure 7:
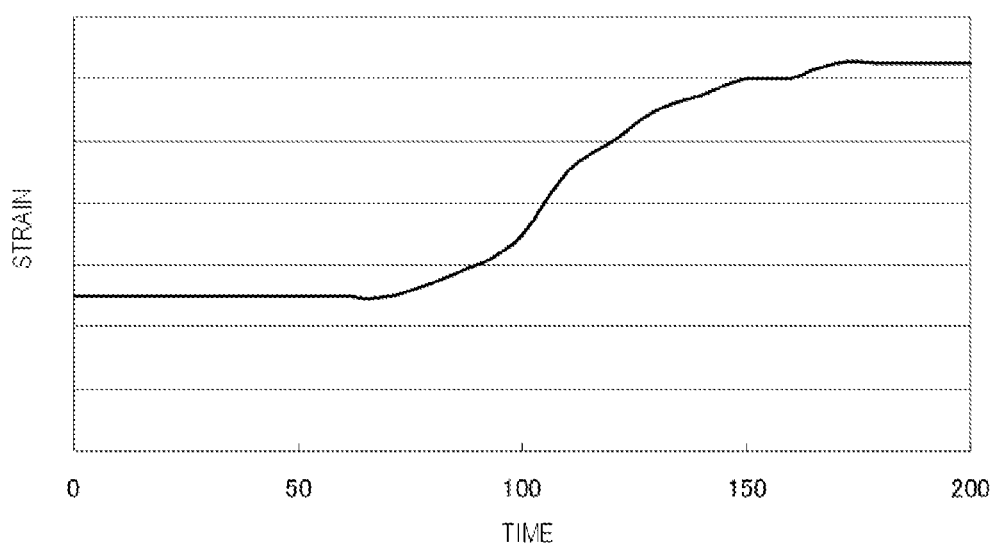
FIG. 7 is a graph conceptually illustrating a temporal change of strain among measurement results obtained by using the system of Embodiment 1 of the present invention for measuring distributions of pressure, temperature, and strain of material.

By acquiring such data as shown in FIG. 6 at predetermined time intervals, time interval data of pressure P, temperature T, and stain ϵ can be obtained at various depth positions. FIG. 7 shows a conceptual temporal-change data of strain ϵ at some depth of the sandstone stratum, acquired during the carbon dioxide injection. In FIG. 7, the time zero is the start point of carbon dioxide injection. As shown in FIG. 7, after some length of time elapses from the injection start, the strain increases gradually and reaches an equilibrium state in due course of time. It is found that the amount of carbon dioxide in the sandstone stratum at the measurement location is saturated at the time when the strain reaches the equilibrium state. Further continuing the injection expands a carbon dioxide trapping zone 101 shown in FIG. 1. Thus, monitoring strain distribution changes allows for monitoring and evaluating an injection state and a sequestrated state of carbon dioxide.

Embodiment 2

Figure 8:
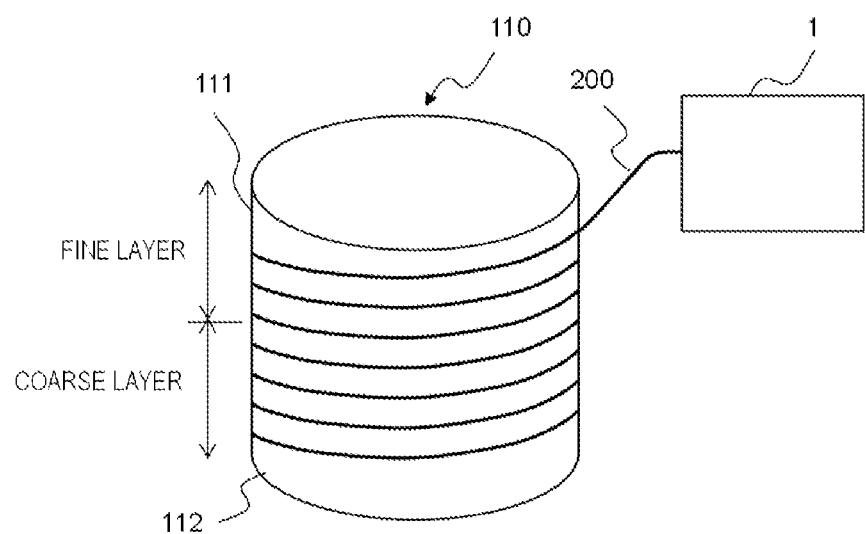
FIG. 8 is a schematic block diagram illustrating a configuration of a laboratory experiment for the system of the present invention for measuring distributions of pressure, temperature, and strain of material.

Embodiment 2 describes an example of a laboratory experiment demonstrating that characteristics of extensive material such as geological strata can be monitored and measured by the system of the present invention for measuring distributions of pressure, temperature, and strain of material. FIG. 8 is a schematic diagram illustrating a configuration of the laboratory experiment. The configuration is such that an optical fiber 200 is spirally wounded around a cylindrical sample called Tago sandstone 110 having a bias in its porosity (permeability) to measure a Brillouin frequency shift and a Rayleigh frequency shift by DPTSS 1. As shown in FIG. 8, the Tago sandstone 110 consists of an upper portion with small porosity (fine layer) and a lower portion with large porosity (coarse layer) for simulating the cap rock stratum 150 and the sandstone 100 shown in FIG. 1, respectively.

After the sample was placed in a pressure vessel and then applied with a confining pressure of 12 MPa, water and carbon dioxide were injected to evaluate a state change of the sample. Since the vessel was uniform in pressure and temperature and showed no distributions thereof, the state change of the sample was evaluated by determining mainly the strain distribution. In the case of the laboratory experiment, other point sensors were used to monitor the pressure and the temperature because they are uniform and constant. Thus, the unknown quantities reduce to the strain only and all of the equations (4) are unnecessary to use. Hence, the measurement can be performed with only one optical fiber.

Figure 9:
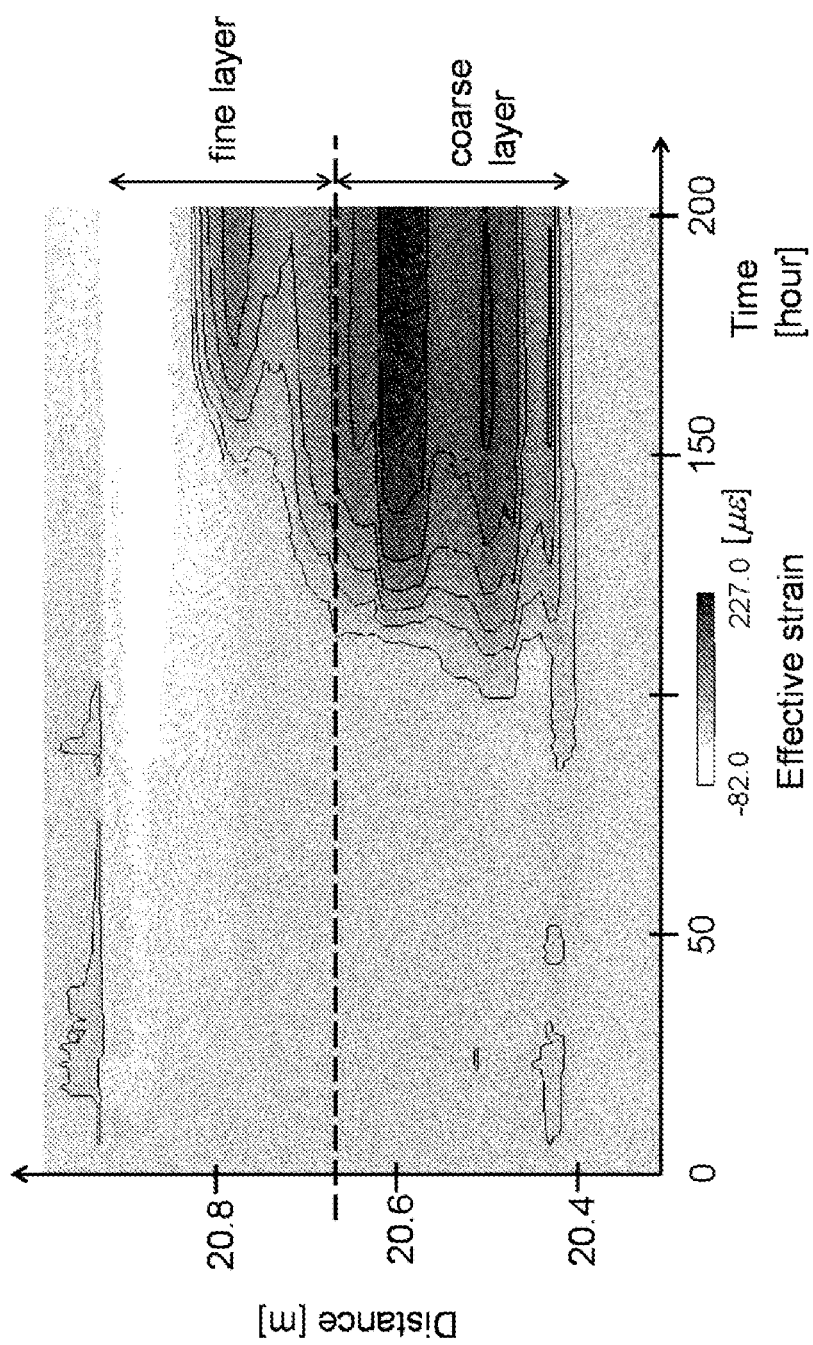
FIG. 9 is a diagram showing an example result of the laboratory experiment for the system of the present invention for measuring distributions of pressure, temperature, and strain of material.

First, water was injected to the sample to observe the water permeation process. Next, carbon dioxide was injected to the sample after the water was fully permeated, to observe the replacement process of the water with carbon dioxide. FIG. 9 is a diagram showing an example result of observing the replacement of the water permeating into the sample Tago sandstone 110 with carbon dioxide. Strain distribution data along the optical fiber 200 wound spirally around the outer surface of the Tago sandstone 110 was acquired at predetermined time intervals. Data similar to the strain distribution data of FIG. 6 can be acquired at each time point. FIG. 9 is a diagram displaying in a gray scale the magnitude of these strain data arranged sequentially with time by taking it as the horizontal axis. A denser gray zone indicates a portion of larger strain.

In FIG. 9, the carbon dioxide injection starts at the time zero and increase in the strain of the large-porosity coarse layer 112 is observed after about 100 hours. The gray scale also indicates the amount of carbon dioxide. A denser gray zone is a portion where the carbon dioxide is permeated more, and changes of the gray density level express permeation of the carbon dioxide into the Tago sandstone 110.

Thus, it is found from the laboratory experiment described in Embodiment 2 that a strain distribution change of the sample Tago sandstone 110 can be measured using the system of the present invention for measuring distributions of pressure, temperature, and strain of material. Furthermore, by evaluating the measurement result, it is possible to monitor, for example, a geologically sequestrated state of carbon dioxide. In the laboratory experiment, there are almost no distributions in pressure and temperature, and their changes can be measured by other means. For carbon dioxide geological sequestration and the like, however, it is necessary to obtain distributions of underground pressure and temperature. The system of the present invention for measuring distributions of pressure, temperature, and strain of material using the first and the second optical fibers 21, 22 allows for obtaining distribution data of underground strain by also simultaneously measuring distributions of the pressure and temperature and using the equations (4). Therefore, the geologically sequestrated state of carbon dioxide can be observed.

Embodiment 3

Embodiment 3 describes application examples enabled by the system of the present invention for measuring distributions of pressure, temperature, and strain of material.

Application Example 1

Embodiments 1 and 2 describes the monitoring during the carbon dioxide injection for geological sequestration. The present system can monitor abnormality after completion of the injection by continuing monitoring of the strain and the like thereafter. For example, it is conceivable that the carbon dioxide leaks through the cap rock stratum 150 from the carbon dioxide trapping zone 101 for such a reason as generation of a crack in the cap rock stratum.

Figure 10:
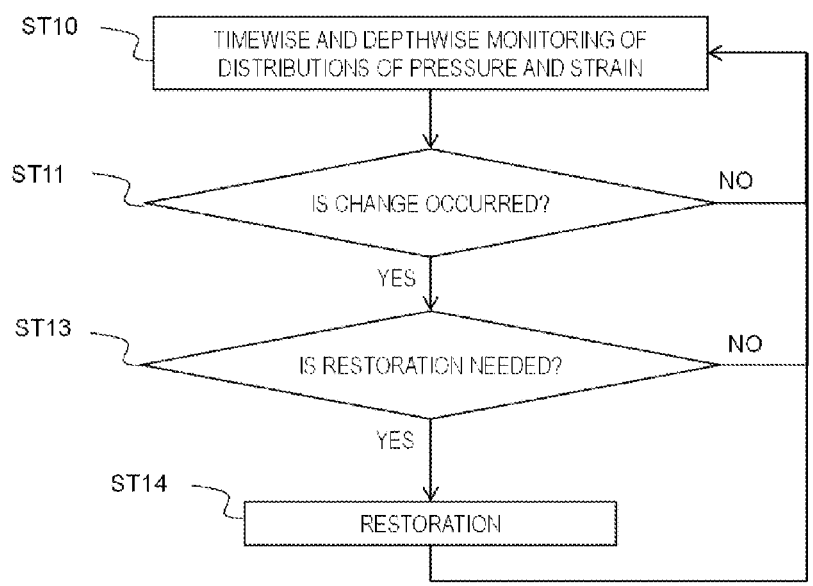
FIG. 10 is a flow diagram showing a process of monitoring leakage from a carbon dioxide trapping zone, as an application example of the system of the present invention for measuring distributions of pressure, temperature, and strain of material.
Figure 11:
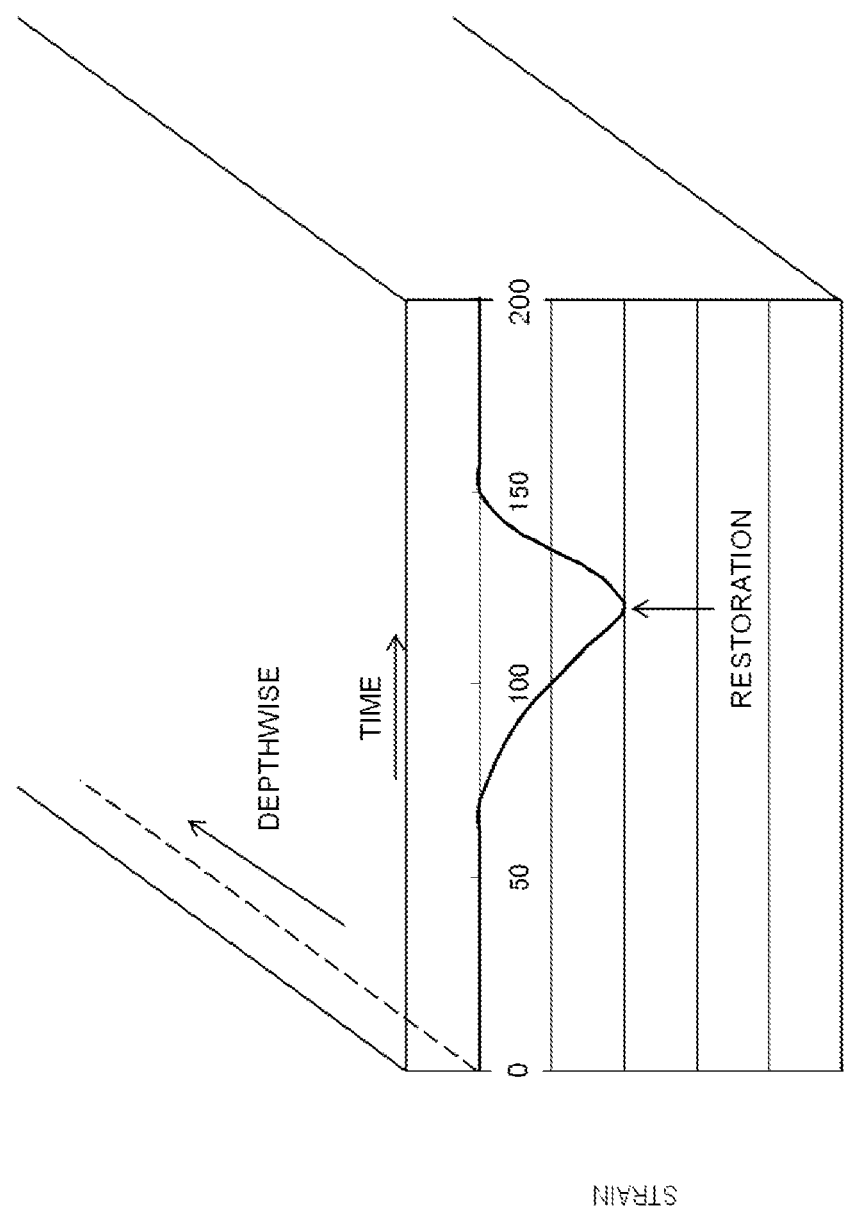
FIG. 11 is a graph conceptually illustrating a result of monitoring leakage from the carbon dioxide trapping zone, as an application example of the system of the present invention for measuring distributions of pressure, temperature, and strain of material.

A flow diagram of monitoring leakage from the carbon dioxide trapping zone 101 is shown in FIG. 10. Strain after completion of the injection is two-dimensionally, i.e., timewise and depthwise, monitored as shown in FIG. 11 (ST10). If no change in the strain occurs, ("NO" in ST11), the monitoring is continued. If a strain change like the example shown in FIG. 11 occurs from some time point ("YES" in ST11), possible leakage of the trapped carbon dioxide can be monitored to judge whether restoration is needed (ST13). If it is judged that a restoration is necessary ("YES" in ST13) and a leaking location can be identified, recovery of the strain by the restoration of the leaking location (ST14) and also success in the restoration can be monitored as shown in FIG. 11 (ST10).

Application Example 2

Figure 12:
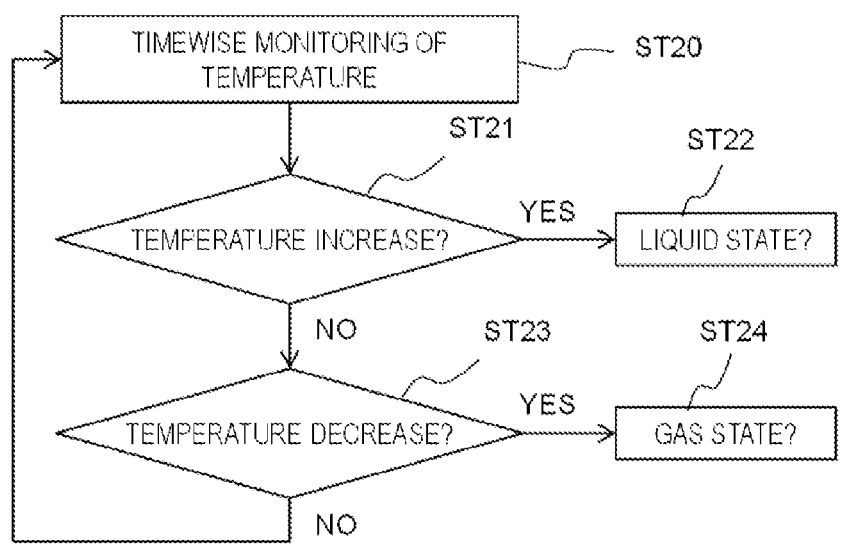
FIG. 12 is a flow diagram showing a process of monitoring a phase change of the underground carbon dioxide, as an application example of the system of the present invention for measuring distributions of pressure, temperature, and strain of material.
Figure 13:
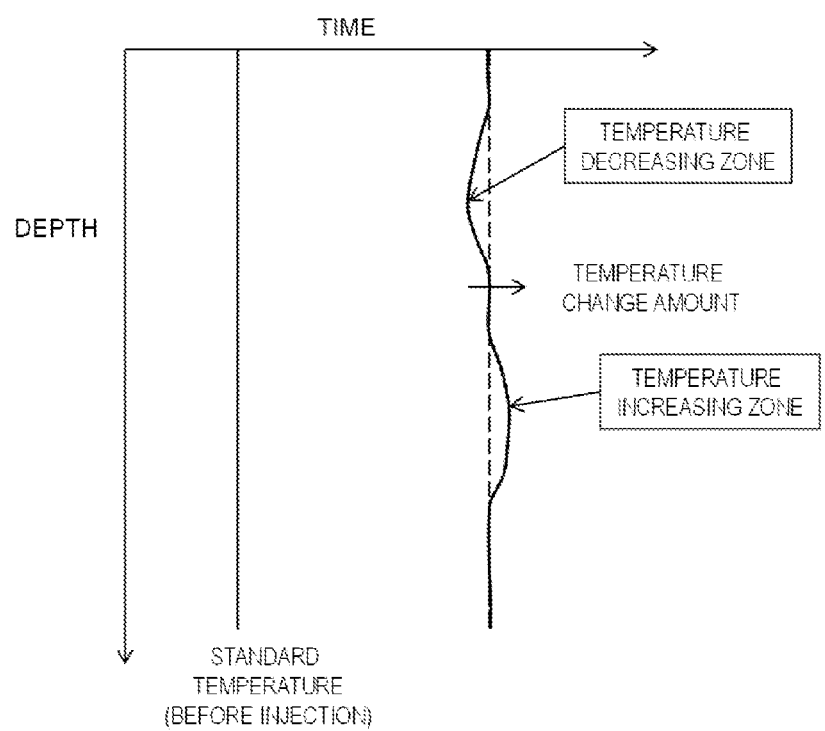
FIG. 13 is a graph conceptually illustrating a result of monitoring phase changes of the underground carbon dioxide, as an application example of the system of the present invention for measuring distributions of pressure, temperature, and strain of material.

Underground carbon dioxide undergoes a phase change to become a liquid state, a gas state, or a supercritical state. A change between these phase states can be monitored by measuring underground temperature changes. A process flow diagram of monitoring these phase states is shown in FIG. 12 and conceptual profiles of the temperatures are shown in FIG. 13. A depthwise temperature distribution is monitored with time (ST20). If a temperature increase occurs ("YES" in ST21), the carbon dioxide in a zone of the temperature increase arising (the temperature increasing zone in FIG. 13) might change from a supercritical state to a liquid state (ST22). To the contrary, if a temperature decrease occurs ("YES" in ST23), the carbon dioxide in a zone of the temperature decrease arising (the temperature decreasing zone in FIG. 13) might change from a liquid state to a gas state (ST24). By monitoring a temporal change of a depthwise temperature distribution in this way, the state change of underground carbon dioxide can be monitored.

Since such phase changes potentially occur, in particular, in a zone at a lesser depth than a cap rock stratum, the zone above the cap rock stratum is necessary to monitor. According to the system of the present invention, a temperature distribution from the ground surface to the sandstone stratum 100 can be measured all the time, thereby allowing for such monitoring.

Application Example 3

Figure 14:
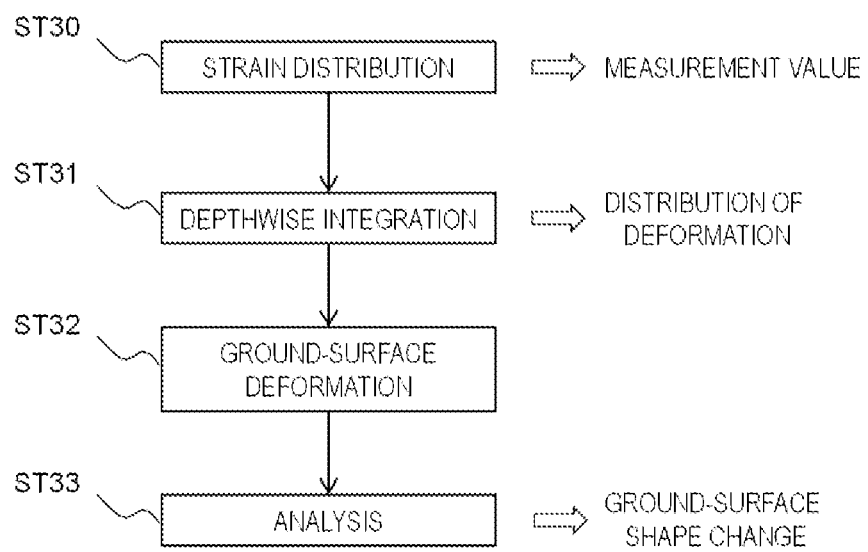
FIG. 14 is a flow diagram showing a process of evaluating a shape change of the ground surface, as an application example of the system of the present invention for measuring distributions of pressure, temperature, and strain of material.
Figure 15:
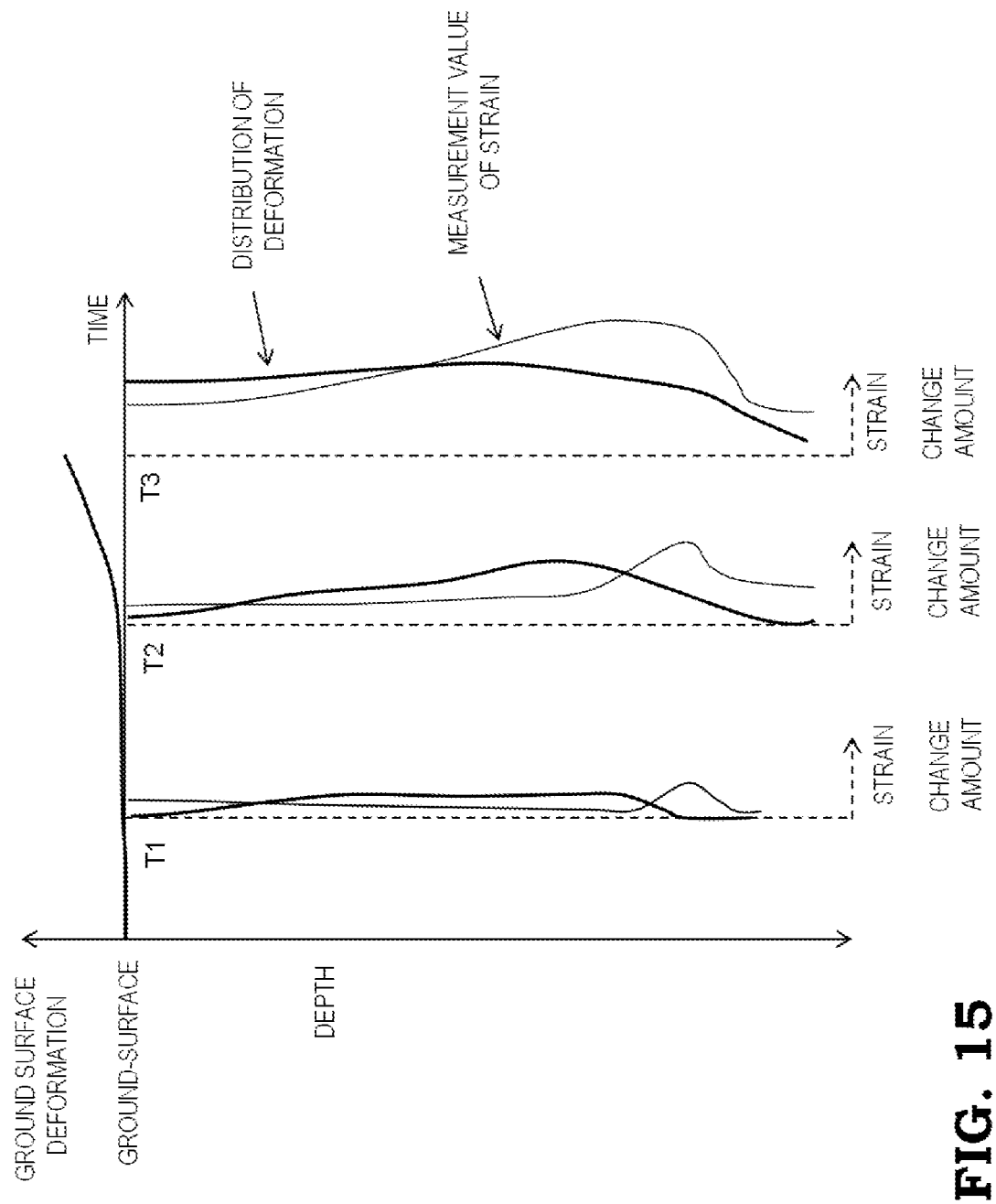
FIG. 15 is graphs conceptually illustrating a result of evaluating a shape change of the ground surface, as an application example of the system of the present invention for measuring distributions of pressure, temperature, and strain of material.

A deformation of strata can be evaluated from an underground strain distribution. FIG. 14 shows a process flow diagram of evaluating, on the basis of a deformation of strata, a shape change of a ground surface, i.e., assessing the impact of carbon dioxide injection on integrity of the strata, and FIG. 15 shows conceptual graphs of measurement strain values and displacement distributions calculated from the strain measurement values. A strain distribution measured at some time point is acquired (ST30). A displacement distribution is obtained by depthwise integrating the strain distribution (ST31). A deformation of the ground surface is obtained from the displacement distribution (ST32). By comparing and analyzing the obtained ground-surface deformation with an actual ground-surface deformation (ST33), a cause of a ground-surface shape change can be evaluated.

As described above, according to the system of the present invention for measuring distributions of pressure, temperature, and strain of material, this measurement system alone can monitor and evaluate various underground states and ground surface states associated with carbon dioxide geological sequestration.

Furthermore, the system of the present invention for measuring distributions of pressure, temperature, and strain of material is applicable to monitoring of not only carbon dioxide geological sequestration but also, for example, an oil well and others such as a system for mining an underground resource by drilling deeply into the ground and the state of underground strata after such mines are abandoned.

Embodiment 4

Figure 16:
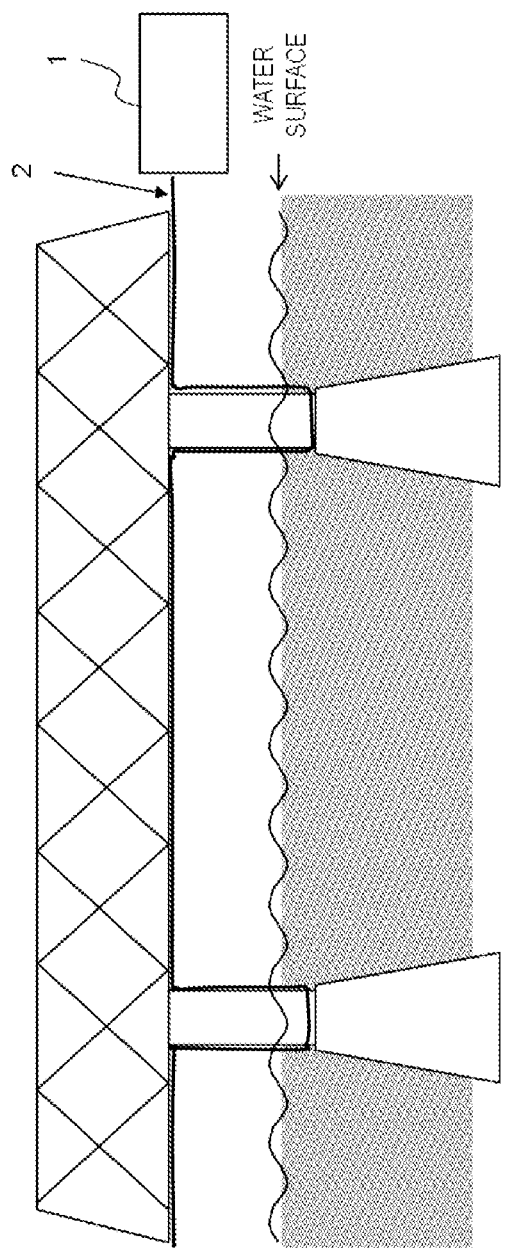
FIG. 16 is a schematic view illustrating a system for monitoring river freezing by mean of a system of Embodiment 4 of the present invention for measuring distributions of pressure, temperature, and strain of material.

The embodiments so far concern monitoring of the state of underground strata such as for carbon dioxide geological sequestration. Embodiment 4 describes a system for monitoring freezing over of a river and the like, other than that for monitoring the state of strata. FIG. 16 illustrates schematic view of a system for monitoring freezing over of a river under a bridge. A sensor cable 2 is set up along the bridge beams and the bridge piers. The sensor cable 2 to be used is that whose cross sectional structure is similar to that shown in FIG. 3. The sensor cable 2 is set up so as to pass through locations where freezing needs to be particularly monitored, for example, through underwater portions of the bridge piers.

Figure 17:
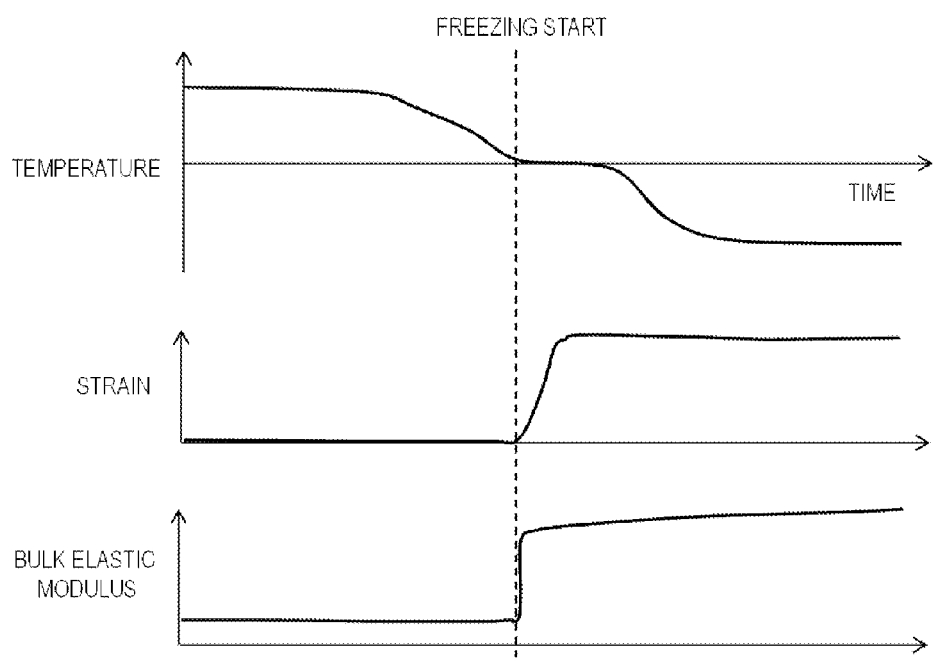
FIG. 17 is graphs conceptually illustrating a result of monitoring river freezing by mean of the system of Embodiment 4 of the present invention for measuring distributions of pressure, temperature, and strain of material.

Brillouin frequency shift measurement and Rayleigh frequency shift measurement are performed by the DPTSS 1 using an optical fiber in the sensor cable 2 to determine simultaneously distributions of pressure, temperature, and strain along the sensor cable 2. The state of freezing can be checked by monitoring temporal changes of these distributions. FIG. 17 shows conceptual graphs when freezing occurs, which illustrate temporal changes of temperature and strain at underwater portions of the sensor cable 2 and of a bulk elastic modulus that is determined from the strain. By measuring changes of the strain and the bulk elastic modulus along with the temperature change as shown in FIG. 17, it is possible to monitor freezing over of a river. Since river water contains salt, mud, and other substances, its freezing temperature is not always 0° C. Therefore, the present system is useful for such monitoring because it is capable of monitoring freezing itself by measuring strain in addition to temperature.

As has been describes above, according to the system of the present invention for measuring distributions of pressure, temperature, and strain of material, simultaneous measurement of distributions of pressure, temperature, and strain of material along an optical fiber and measurement of temporal changes of these distributions can be performed by one measurement system alone. Therefore, monitoring of the state of extensive material and the like can be performed accurately. In particular, the present invention brings about a great effect in monitoring the state of such extensive material as using a long optical fiber of more than 100 m.

REFERENCE NUMERALS

1, 1a, 1b: DTPSS
2, 2a, 2b: sensor cable
3a: injection well
3b: observation well
11: scattering wave acquisition unit
12: Brillouin frequency-shift measurement unit
13: Rayleigh frequency-shift measurement unit
14: coefficient storage unit
15: analyzer unit
16: distribution data storage unit
17: evaluation calculation unit
21: first optical fiber
22: second optical fiber
23: protection cover
24: fine metal tube
25: metal wire
31: casing
32: injection tube
34: cementing
40: storage site
100: sandstone stratum
101: carbon dioxide trapping zone
110: Tage sandstone sample
111: upper sample portion (fine layer)
112: lower sample portion (coarse layer)
150: cap rock stratum
200: optical fiber

The invention claimed is:

1. A system for measuring distributions of pressure, temperature, and strain of material, comprising:
a first optical fiber and a second optical fiber, the first optical fiber and the second optical fiber each being sensitive to pressure, temperature and strain, the first optical fiber and the second optical fiber being positioned in or along a material, the first optical fiber being supported so as to be strained with the material and to be subject to influence of pressure and the second optical fiber being accommodated in a fine metal tube so as to be free from the influence of pressure and to be strained independently from the first optical fiber, wherein the first optical fiber is exposed to the same temperature as the second optical fiber and is exposed to pressure and strain differently than the second optical fiber accommodated in the fine metal tube;

a light detector which acquires optical fiber scattered waves of pulse laser light entered into the first and second optical fibers;

a hardware processor configured to;

measure a distribution of a first Brillouin frequency shift in the first optical fiber and a second Brillouin frequency shift in the second optical fiber from the scattered waves acquired by the light detector;

measure a distribution of a first Rayleigh frequency shift in the first optical fiber and a second Rayleigh frequency shift in the second optical fiber from the scattered waves acquired by the light detector;

store first coefficients that are inherent to the first optical fiber and correlate pressure, temperature, and strain of material with the first Brillouin frequency shift and the first Rayleigh frequency shift;

store second coefficients that are inherent to the second optical fiber and correlate temperature and strain of material with the second Brillouin frequency shift and the second Rayleigh frequency shift; and determine, through analysis, distributions of pressure, temperature, and strain of the material along the first and second optical fibers at a measurement time point, using the Brillouin frequency-shift distribution measured by the hardware processor, the Rayleigh frequency-shift distribution measured by the hardware processor, and the stored coefficients.

2. The system of claim 1 for measuring distributions of pressure, temperature, and strain of material, wherein the length of the optical fibers are 100 m or longer.

3. The system of claim 1 for measuring distributions of pressure, temperature, and strain of material, wherein the hardware processor determines a pressure change amount $\Delta P$ and a temperature change amount $\Delta T$, and a strain change amount $\Delta\epsilon^1$ of the first optical fiber and a strain change amount $\Delta\epsilon^2$ of the second optical fiber that are changed from an initial measurement, using the stored coefficients, which are coefficients $C^1_{13}$, $C^1_{12}$, $C^1_{11}$, $C^2_{12}$, $C^2_{11}$ for correlating, with the Brillouin frequency shift, pressure applied to the first optical fiber, temperature of the first optical fiber, and strain of the first optical fiber, and temperature of the second optical fiber and strain of the second optical fiber, respectively; and coefficients $C^1_{23}$, $C^1_{22}$, $C^1_{21}$, $C^2_{22}$, $C^2_2$, for correlating, with the Rayleigh frequency shift, pressure applied to the first optical fiber, temperature of the first optical fiber, and strain of the first optical fiber, and temperature of the second optical fiber and strain of the second optical fiber, respectively, and a Brillouin frequency shift $\Delta v^1_B$ and a Rayleigh frequency shift $\Delta v^1_R$ from the initial measurement that are measured with the first optical fiber; and a Brillouin frequency shift $\Delta v^2_B$ and a Rayleigh frequency shift $\Delta v^2_R$ from the initial measurement that are measured with the second optical fiber, and using simultaneous equations $$\Delta v^1_B = C^1_{13}\Delta P + C^1_{12}\Delta T + C^1_{11}\Delta\epsilon^1$$

$$\Delta v^1_R = C^1_{23}\Delta P + C^1_{22}\Delta T + C^1_{21}\Delta\epsilon^1$$

$$\Delta v^2_B = +C^2_{12}\Delta T + C^2_{11}\Delta\epsilon^2$$

$$\Delta v^2_R = +C^2_{22}\Delta T + C^2_{21}\Delta\epsilon^2.$$

4. The system of claim 1 for measuring distributions of pressure, temperature, and strain of material, wherein the optical fibers are set up along an injection well or an observation well for carbon dioxide geological sequestration from a ground surface to a sandstone stratum constituting carbon dioxide trapping zone.

5. A method of monitoring carbon dioxide geological sequestration, comprising monitoring a state of carbon dioxide injected into a sandstone stratum by observing at least a temporal change of a strain distribution using a system of claim 4 for measuring distributions of pressure, temperature, and strain of material.

6. A method of monitoring carbon dioxide geological sequestration, comprising monitoring leakage of carbon dioxide trapped in a sandstone stratum by observing at least a temporal change of a strain distribution using a system of claim 4 for measuring distributions of pressure, temperature, and strain of material.

7. A method of monitoring carbon dioxide geological sequestration, comprising monitoring a phase change of underground carbon dioxide by observing at least a temporal change of a temperature distribution using a system of claim 4 for measuring distributions of pressure, temperature, and strain of material.

8. A method of assessing an impact of carbon dioxide injection on integrity of strata, comprising
    determining a underground and a ground-surface displacements by depthwise integrating a strain distribution measured using a system of claim 4 for measuring distributions of pressure, temperature, and strain of material; and
    evaluating a ground-surface shape change from the determined displacements.

9. The system of claim 1 for measuring distributions of pressure, temperature, and strain of material, wherein the optical fibers are set up at least along a bridge pier built in water.

10. A method of monitoring freezing of water around a bridge pier, comprising observing at least temporal changes of strain and temperature using a system of claim 9 for measuring distributions of pressure, temperature, and strain of material.

* * * * *